(12) United States Patent
Santos et al.

(10) Patent No.: US 7,743,127 B2
(45) Date of Patent: Jun. 22, 2010

(54) RESOURCE ALLOCATION IN DATA CENTERS USING MODELS

(75) Inventors: Cipriano A. Santos, Modesto, CA (US); Xiaoyun Zhu, San Jose, CA (US); Harlan Crowder, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1230 days.

(21) Appl. No.: 10/269,896

(22) Filed: Oct. 10, 2002

(65) Prior Publication Data

US 2004/0073673 A1   Apr. 15, 2004

(51) Int. Cl.
G06F 15/173 (2006.01)
(52) U.S. Cl. ...................................... 709/223; 709/224
(58) Field of Classification Search .......... 709/223–226
See application file for complete search history.

(56) References Cited

U.S. PATENT DOCUMENTS

| | | | | |
|---|---|---|---|---|
| 5,440,675 A | * | 8/1995 | Matsunaga et al. | 345/440 |
| 5,471,408 A | * | 11/1995 | Takamoto et al. | 703/2 |
| 6,012,052 A | * | 1/2000 | Altschuler et al. | 707/2 |
| 6,219,649 B1 | * | 4/2001 | Jameson | 705/8 |
| 6,487,455 B1 | * | 11/2002 | Balasubramanian | 700/2 |
| 6,915,338 B1 | * | 7/2005 | Hunt et al. | 709/220 |
| 2003/0120780 A1 | * | 6/2003 | Zhu et al. | 709/226 |

* cited by examiner

Primary Examiner—Lashonda T Jacobs

(57) ABSTRACT

A method for resource allocation in a data center is disclosed which employs modeling techniques that enable resource allocation in large-scale data centers. A method for resource allocation according to the present techniques includes providing a model for resource allocation which is adapted to a resource topology of a data center and an architecture of an application to be deployed in the data center. A set of resources in the data center are allocated to the application using the model in response to a set of resource requirements of the application and a set of attributes of the resources in the data center such that communication delay among the resources allocated to the application is minimized. Techniques are disclosed for decomposing the model into a set of more tractable programming models which may be solved using available mathematical programming solvers.

25 Claims, 4 Drawing Sheets

```
┌─────────────────────────────────┐
│ Determine an Approximate Solution│
│ Using a Substitute Model That    │
│ Removes Constraints in the Model │
│              310                 │
└─────────────────────────────────┘
                │
                ▼
┌─────────────────────────────────┐
│ Determine a Solution to a Relaxation│
│ of the Model Based on Feasibility│
│     of Resource Allocation       │
│              312                 │
└─────────────────────────────────┘
                │
                ▼
┌─────────────────────────────────┐
│     Identify the Resources       │
│  Allocated to the Application    │
│   by Rounding the Solution       │
│              314                 │
└─────────────────────────────────┘
```

FIG. 5

RESOURCE ALLOCATION IN DATA CENTERS USING MODELS

BACKGROUND OF THE INVENTION

1. Field of Invention

The present invention pertains to the field of optimal resource allocation to applications. More particularly, this invention relates to resource allocation to application in data centers.

2. Art Background

A data center may be defined as a facility having a set of resources for supporting multiple applications. For example, a data center for supporting Internet applications typically includes a set of servers and network resources onto which a variety of Internet applications may be deployed.

The deployment of an application in a data center usually includes a process of resource allocation. Resource allocation typically involves identifying which of the resources of the data center are to be used by an application.

An application to be deployed in a data center is usually characterized by a set of application requirements. The application requirements usually include a desired arrangement of resources each having desired capabilities. For example, the application requirements of an Internet application may specify a desired arrangement of servers having desired performance characteristics and storage capacities and communication paths among the servers having desired bandwidth capacities.

A data center on the other hand is usually characterized by a given set of resources having given capabilities. For example, a data center for Internet applications usually has a given arrangement of servers each of which has given performance characteristics and storage capacities. In addition, the network elements in a data center usually have given communication bandwidth capacities.

As a consequence, the deployment of an application in a data center usually involves identifying which of the resources of the data center are to be allocated for use by the application so as to satisfy the application requirements given the capabilities of the data center. For example, the deployment of an Internet application in an Internet data center usually involves identifying which of the servers of the Internet data center are to be allocated to the Internet application so as to satisfy the performance requirements and communication bandwidth requirements of the Internet application.

Prior methods for resource allocation in a data center are usually based on manual techniques in which an individual such as a system administrator identifies the servers that are to be allocated to an application. Unfortunately, such manual methods are usually ineffective for deploying applications in large data centers. For example, an Internet data center may be extremely large having tens of thousands of servers for supporting extremely large numbers of Internet applications. Under such circumstances, it may be impossible for an individual to process the complexities and sheer volume of information involved in resource allocation.

SUMMARY OF THE INVENTION

A method for resource allocation in a data center is disclosed which employs modeling techniques that enable resource allocation in large-scale data centers. A method for resource allocation according to the present techniques includes providing a model for resource allocation which is adapted to a resource topology of a data center and an architecture of an application to be deployed in the data center. A set of resources in the data center are allocated to the application using the model in response to a set of resource requirements of the application and a set of attributes of the resources in the data center such that communication delay among the resources allocated to the application is minimized. Techniques are disclosed for decomposing the model into a set of more tractable models which may be solved using available solvers.

The present resource allocation techniques enable deployment and redeployment of a suite of complex applications with diverse requirements and dynamic characteristics based on service-level agreements. Resources may be allocated using the present techniques when applications are initially deployed in a data center or when changes in workload intensity require that resources be added to or removed from an application.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 5 shows a method for allocating resources by decomposing a model into a set of more tractable programming problems.

DETAILED DESCRIPTION

Figure 1:
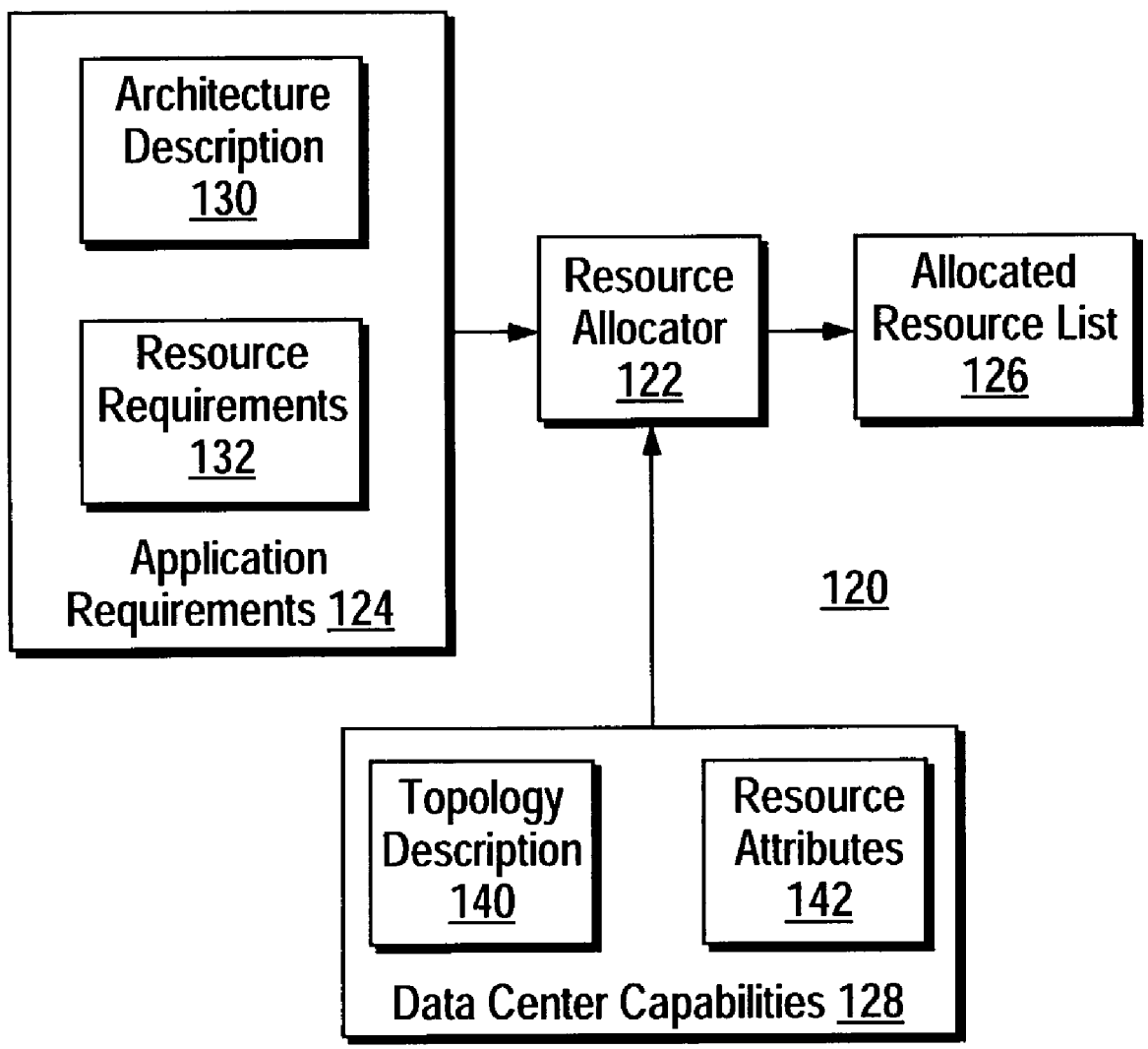
FIG. 1 illustrates a resource deployment system that incorporates the present teachings.

FIG. 1 illustrates a resource deployment system 120 that incorporates the present teachings. The resource deployment system 120 includes a resource allocator 122 that generates an allocated resource list 126 in response to a set of application requirements 124 for an application to be deployed and a set of data center capabilities 128 that pertain to a data center into which the application having an application requirements 124 is to be deployed.

The data center capabilities 128 include a topology description 140 and a set of resource attributes 142. The topology description 140 sets forth a physical topology of data center resources and the resource attributes 142 provides a set of attributes for each of the data center resources.

The application requirements 124 include an architecture description 130 and a set of resource requirements 132. The architecture description 130 sets forth an arrangement of resources needed in an application and the resource requirements 132 sets forth required attributes of the resources listed in the architecture description 130.

The allocated resource list 126 identifies which of the physical resources in the topology description 140 are to be assigned to each logical resource in an application having the application requirements 124.

The resource deployment system 120 may be implemented as a combination of hardware/software—for example software distributable using a variety of media that when executed on a computer system or set of computer systems performs the method steps set forth below. Alternatively, the resource deployment system 120 may be implemented in dedicated resource allocation hardware and associated code.

Figure 2:
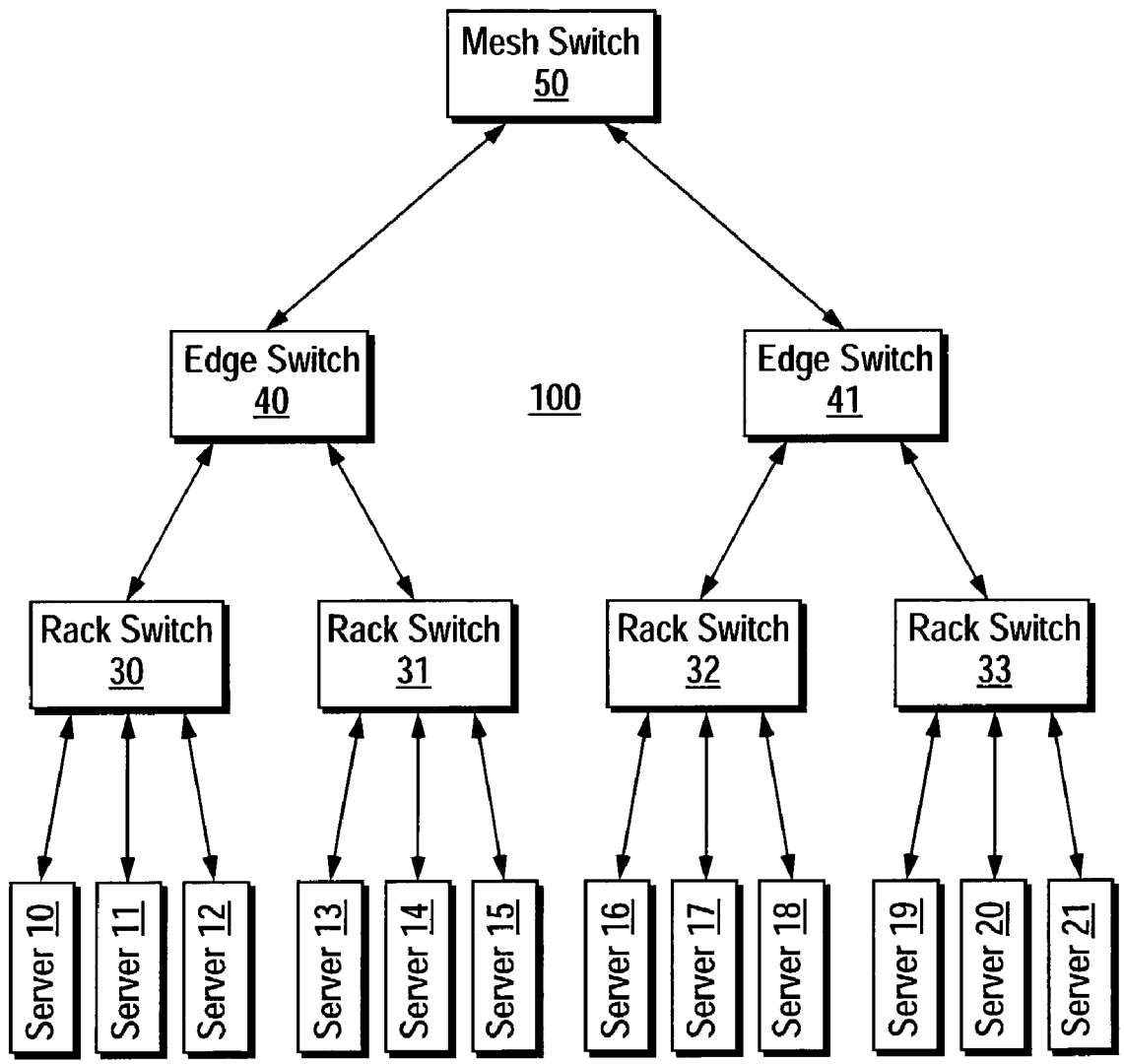
FIG. 2 illustrates a physical topology of a data center in one embodiment.

FIG. 2 illustrates a physical topology 100 of a data center in one embodiment. The physical topology 100 forms a hierarchical tree. In other embodiments, other types of physical topologies may be applicable.

The root of the physical topology 100 is a mesh switch 50. The mesh switch 50 may be implemented as a tightly connected group of switches acting as a single device. Below the root are a set of edge switches 40-41. Below the edge switches 40-41 are a set of rack switches 30-33.

At the bottom of the physical topology 100 are a set of servers 10-21 which in this embodiment are the resources to be deployed to an application. The present techniques are nevertheless applicable to the deployment of resources other than servers—for example networking components such as firewalls and load balancers, networked storage devices and computing elements, etc.

The physical topology 100 including an enumeration of the switches 50, 40-41, and 30-33 and the servers 10-21 as well as interconnections among these elements is set forth in the topology description 140.

The resource attributes 142 which correspond to the physical topology 100 include a set of attributes for each of the servers 10-21. In one embodiment, the attributes of each server 10-21 includes the number of CPUs it contains, the corresponding CPU speeds, and the size of the memory it contains. In addition, the resource attributes 142 list an associated incoming and outgoing bandwidth capacity, measured in Gbps, for each server 10-12, each rack switch 30-33, and each edge switch 40-41.

Figure 3:
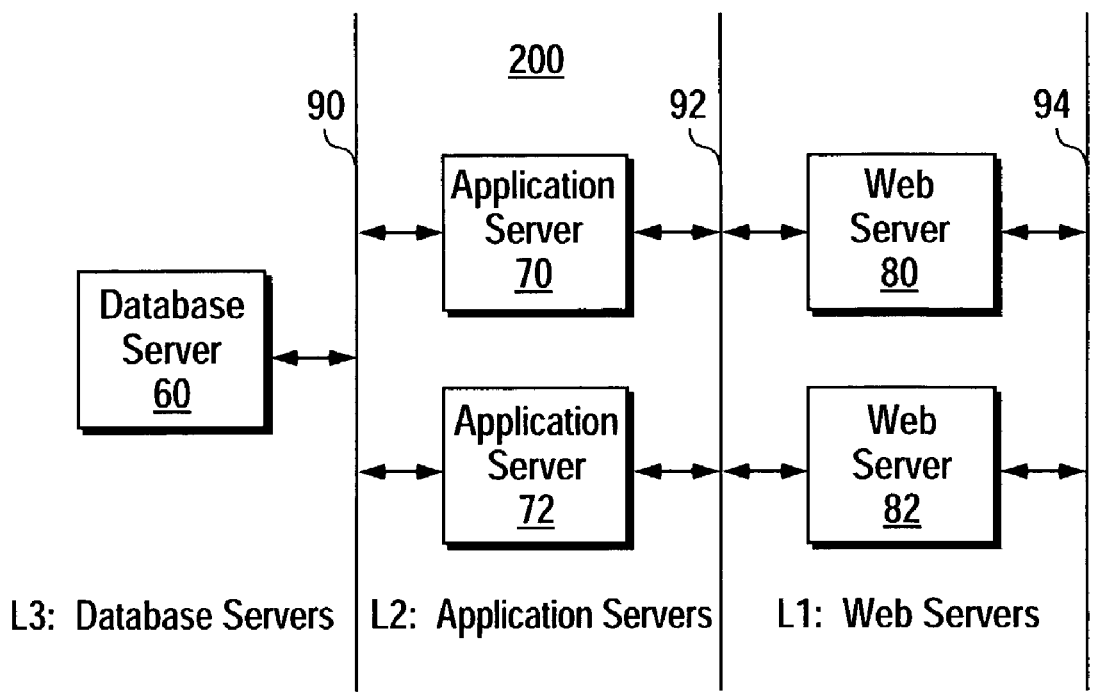
FIG. 3 illustrates an architecture of an application which is to be deployed in a data center in one embodiment.

FIG. 3 illustrates an architecture 200 of an application which is to be deployed in a data center. The architecture 200 in one embodiment is a multi-layered architecture including a layer of web servers (L1), a layer of application servers (L2), and a layer of database servers (L3). In this example, layers L1 and L2 require two servers each—the web servers 80-82 and the application servers 70-72, respectively, and layer L3 requires one server—the database server 60. Communication among layers is enabled via a set of virtual local area networks (VLANs) 90-94.

The architecture 200 shown including a specification of the web servers 80-82 and the application servers 70-72 and the database server 60 as well as the VLAN interconnections among these elements is set forth in the architecture description 130.

The resource requirements 132 which correspond to the architecture 200 include minimum and maximum values for each of a set of attributes of the servers in the layers L1-L3. In one embodiment, these attributes include the minimum and maximum of the number of CPUs needed, the CPU speed, and the memory capacity for any server in a layer. In addition, there are specifications of a maximum amount of data traffic, measured in Gbps, going from each server in a layer to each server in another layer. In one embodiment, these specifications are for the maximum amount of traffic going between each pair of servers in two consecutive layers.

Figure 4:
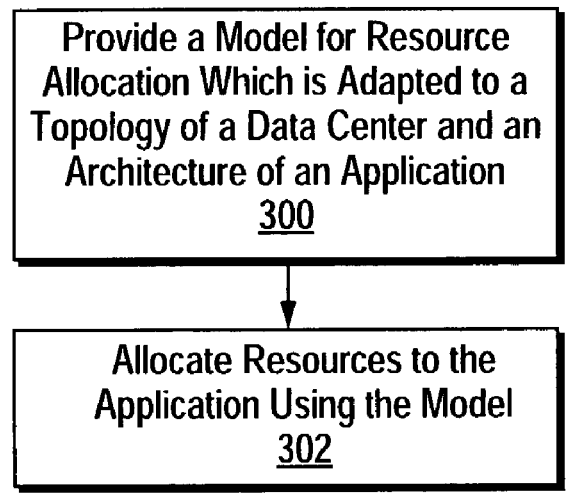
FIG. 4 shows a method for resource allocation according to the present techniques.

FIG. 4 shows a method for resource allocation according to the present techniques. The resource allocator 122 performs the steps shown to generate the allocated resource list 126 in response to the application requirements 124 and the data center capabilities 128.

At step 300, a model for resource allocation is provided which is adapted to a topology of a data center and an architecture of an application to be deployed in the data center. The topology of the data center is specified in the topology description 140 and the architecture of the application is specified in the architecture description 130. The model at step 300 may be a mathematical model, a simulation model expressed as computer code, or any other abstraction of a resource allocation process in a data center.

In an embodiment adapted to the example physical topology 100 and example architecture 200, the model provided at step 300 is based on the assumption that servers at the same layer of the architecture 200 have the same functionality and therefore same resource requirements, that the amount of traffic generated by different servers in the same layer is similar, and that the amount of traffic coming into each layer is evenly distributed among all the servers in the layer, and that no traffic goes between servers in the same layer. In other embodiments for deploying applications having different architectures or traffic characteristics, the models presented below may be readily extended to deal with these variations.

The following notation is used to describe a model for resource allocation in one embodiment according to the present techniques.

l∈L: Set of layers, where |L| represents the number of layers. [Alternative index i]

s∈S: Set of servers, where |S| represents the number of layers. [Alternative index j]

a∈A: Set of attributes for servers, where |A| represents the number of attributes.

r∈R: Set of rack switches, where |R| represents the number of rack switches. [Alternative index q]

e∈E: Set of edge switches, where |E| represents the number of edge switches.

The network aspects of the physical topology 100 may be captured using the following sets.

$SR_r \subset L$: Set of servers connected to rack switch r.

$SE_e \subset S$: Set of servers connected to edge switch e.

$R_e \subset R$: Set of rack switches connected to edge switch e.

The resource attributes 142 of servers 10-21 in the physical topology 100 are represented by the matrix V, where each element $V_{as}$ represents the value of the attribute a of server s. The bandwidth capacity of the servers 10-21, the rack switches 30-33, and the edge switches 40-41 are represented by the following set of parameters.

$BSI_s$: The incoming bandwidth of server s.

$BSO_s$: The outgoing bandwidth of server s.

$BRI_r$: The incoming bandwidth of rack switch r.

$BRO_r$: The outgoing bandwidth of rack switch r.

$BEl_e$: The incoming bandwidth of edge switch e.

$BEO_e$: The outgoing bandwidth of edge switch e.

The architecture description 130 of the architecture 200 include the number of servers to be allocated to each layer l as defined by $N_l$. The maximum and minimum attribute requirements are represented by two matrices VMAX and VMIN, where each element $VMAX_{la}$ and $VMIN_{la}$ represent the maximum and minimum level of attribute a for any server in layer l.

The matrix T is defined to characterize the traffic pattern of the architecture 200, where the element $T_{li}$ represents the maximum amount of traffic going from each server in layer l to each server in layer i. The numbers $T_{01}$ and $T_{10}$ represent the Internet traffic coming into and going out of each server in layer 1. Using these traffic parameters, the total amount of incoming and outgoing traffic at each server in different layers may be determined and denoted by $TI_l$ and $TO_l$, respectively.

A decision variable for determining which server 10-21 should be assigned to which layer of the architecture 200 is represented using binary variables such that $x_{ls}=1$ means that server s is assigned to layer l and $x_{ls}=0$ otherwise.

A model for resource allocation given the architecture 200 and the physical topology 100 is as follows.

$$\text{Max} \sum_{r \in R} \sum_{j \in SR_r} \sum_{i \in L} \sum_{l \in L} \sum_{s \in SR_r} T_{li} x_{ls} x_{ij} + \sum_{e \in E} \sum_{j \in SE_e} \sum_{i \in L} \sum_{l \in L} \sum_{s \in SE_e} T_{li} x_{ls} x_{ij} \quad (5)$$

Subject to the following constraints 1-9.

$$\sum_{s \in S} x_{ls} = N_l, \, l \in L \quad (1)$$

$$\sum_{l \in L} x_{ls} \leq 1, \, s \in S \quad (2)$$

$$\sum_{l \in L} VMIN_{la} X_{ls} \leq \left(\sum_{l \in L} X_{ls}\right) V_{as} \leq \sum_{l \in L} VMAX_{la} X_{ls}, \, a \in A, \, s \in S \quad (3)$$

$$\sum_{l \in L} TO_l x_{ls} \leq BSO_s, \, s \in S \quad (4)$$

$$\sum_{l \in L} Tl_l x_{ls} \leq BSl_s, \, s \in S \quad (5)$$

$$\sum_{l \in L} \sum_{s \in SR_r} TO_l x_{ls} - \sum_{j \in SR_r} \sum_{i \in L} \sum_{l \in L} \sum_{s \in SR_r} T_{li} x_{ls} x_{ij} \leq BRO_r, \, r \in R \quad (6)$$

$$\sum_{l \in L} \sum_{s \in SR_r} Tl_l x_{ls} - \sum_{j \in SR_r} \sum_{i \in L} \sum_{l \in L} \sum_{s \in SR_r} T_{li} x_{ls} x_{ij} \leq BRl_r, \, r \in R \quad (7)$$

$$\sum_{l \in L} \sum_{s \in SE_e} TO_l x_{ls} - \sum_{j \in SE_e} \sum_{i \in L} \sum_{l \in L} \sum_{s \in SE_e} T_{li} x_{ls} x_{ij} \leq BEO_e, \, e \in E \quad (8)$$

$$\sum_{l \in L} \sum_{s \in SE_e} Tl_l x_{ls} - \sum_{j \in SE_e} \sum_{i \in L} \sum_{l \in L} \sum_{s \in SE_e} T_{li} x_{ls} x_{ij} \leq BEl_e, \, e \in E \quad (9)$$

$$x_{ls}, x_{ij} \in \{0, 1\}, \, l, i \in L \, s, j \in S$$

At step 302, a set of resources in the data center are allocated to the application using the model from step 300 in response to a set of resource requirements of the application and a set of attributes of the resources in the data center. In one embodiment, the allocation is performed such that communication delay among the resources allocated to the application is minimized.

The inputs to the model generated at step 300 include the resource requirements 132 of the application being deployed and the resource attributes 142 of the data center onto which the application is being deployed.

The model from step 300 includes a nonlinear objective function and a set of nonlinear constraints. These factors impose a nonlinear programming problem with binary variables which may not be solved efficiently by available mathematical programming solvers.

FIG. 5 shows a method for allocating resources by decomposing the model of step 300 into a set of more tractable mathematical programming problems.

At step 310, an approximate solution to the model of step 300 is determined using a substitute model that does not include one or more constraints associated with the resource requirements 132 and/or the resource attributes 142. In one embodiment, a mixed integer programming problem is formulated that minimizes the number of rack switches and edge switches involved. This objective function is a surrogate of the original objective function where latency is minimized. In this approximate solution, the visibility of the specific servers that are feasible in terms of the application requirements is eliminated while retaining the visibility of the number of feasible servers at each rack. The approximate solution does not consider rack and edge switch bandwidth constraints. A substitute model according to step 310 is as follows.

$$\text{Min} \sum_{e \in E} CE_e u_e + \sum_{r \in R} CR_r v_r$$

Subject to the following.

$$\sum_{r \in R} xr_{lr} = N_l, \, l \in L$$

Assuming a 3 layer architecture in the example architecture 200, for all r∈R, $$xr_{l1,r} + xr_{l2,r} + xr_{l3,r} \leq |FSR_{l1,r} \cup FSR_{l2,r} \cup FSR_{l3,r}|$$

$$xr_{l1,r} + xr_{l2,r} \leq |FSR_{l1,r} \cup FSR_{l2,r}|$$

$$xr_{l2,r} + xr_{l3,r} \leq |FSR_{l1,r} \cup FSR_{l3,r}|$$

$$xr_{l2,r} + xr_{l3,r} \leq |FSR_{l1,r} \cup FSR_{l3,r}|$$

$$0 \leq xr_{l1,r} \leq |FSR_{l1,r}|, 0 \leq xr_{l2,r} \leq |FSR_{l2,r}|, 0 \leq xr_{l3,r} \leq |FSR_{l3,r}|$$

$$N_l v_r \geq xr_{l,r}, FSR_{l,r} \neq \emptyset$$

$$u_e \geq v_r, e \in E, r \in R_e$$

$$u_e, v_r \in \{0, 1\}, e \in E, r \in R$$

$$xr_{ls} \geq 0, \, l, r \in L \times R, \sum_{s \in SR_r} F_{ls} \geq l$$

The set $FSR_{l,r} \subset SR_r \subset S$ is the set of servers connected to rack switch r that are feasible for layer l. F is a feasibility matrix such that $F_{ls}$ equals 1 if $X_{ls}$ satisfies constraints 3, 4, and 5 set forth in the model from step 300 and is equal to zero otherwise.

The location variables are as follows. For each e∈E, $u_e$ equals 1 if edge switch e is used and equals zero otherwise. For each r∈R, $v_r$ equals 1 if rack switch r is used and equals zero otherwise.

The weight for each switch used is a latency measure (number of hops) for that switch, i.e., $CR_r=2$ and $CE_e=4$.

A new decision variable is defined as follows.

$xr_{l,r}$: Number of servers connected to rack switch r that are allocated to layer l.

$xr_{l,r} \in [0, N_l]$.

For a given rack r, $$xr_{lr} = \sum_{s \in SR_r} xr_{ls}$$

The approximate solution given above may be solved using a currently available mathematical programming solvers—for example CPLEX.

At step 312, a solution is determined to a relaxation of the model of step 300 which is based on feasibility of resource allocation and which uses the approximate solution from step 310 as an initial solution. In one embodiment, the solution determined at step 312 is based on feasibility of resource allocation with respect to rack and edge switches bandwidth capacity constraints. This yields a nonlinear optimization problem which is formulated in terms of the number of feasible servers at each rack switch allocated. This formulation is a relaxation because all the decision variables can be continuous variables instead of integer variables. Given that this nonlinear formulation provides only local optima instead of global ones it is used along with step 310.

For combinatorial optimization problems with binary variables, it is sometimes advisable, if possible, to reformulate the problem in terms of continuous variables over an interval. This brings convexity to the formulation and helps the continuous relaxation to be stronger, which means that the relaxation will give tighter bounds. For this purpose, a quadratic programming approximation of the original problem is formulated.

The variable $xr_{lr}$ appears in the quadratic programming approximation if an only if the following is true.

$$\sum_{s \in SR_r} F_{ls} \geq 1$$

i.e. if the rack switch r has a feasible server for layer l.

A quadratic programming approximation from step 312 is as follows.

$$\text{Max} ZQP = \sum_{r \in R} \sum_{i \in L} \sum_{l \in L} T_{li} xr_{lr} xr_{ir} + \sum_{e \in E} \sum_{r \in R_e} \sum_{i \in L} \sum_{l \in L} T_{li} xr_{lr} xr_{ir}$$

Subject to the following.

$$\sum_{r \in R} xr_{lr} = N_l, l \in L$$

Assuming a 3 layer architecture in the example architecture 200, for all $r \in R$, $xr_{l1r} + xr_{l2r} + xr_{l3r} \leq |FSR_{l1r} \cup FSR_{l2r} \cup FSR_{l3r}|$ $xr_{l1r} + xr_{l2r} \leq |FSR_{l1r} \cup FSR_{l2r}|$ $xr_{l1r} + xr_{l3r} \leq |FSR_{l1r} \cup FSR_{l3r}|$ $xr_{l2r} + xr_{l3r} \leq |FSR_{l2r} \cup FSR_{l3r}|$ $0 \leq xr_{l1r} \leq |FSR_{l1r}|, 0 \leq xr_{l2r} \leq |FSR_{l2r}|, 0 \leq xr_{l3r} \leq |FSR_{l3r}|$ $$\sum_{l \in L} TO_l xr_{lr} - \sum_{i \in L} \sum_{l \in L} T_{li} xr_{lr} xr_{ir} \leq BRO_r, r \in R$$

$$\sum_{l \in L} TI_l xr_{lr} - \sum_{i \in L} \sum_{l \in L} T_{li} xr_{lr} xr_{ir} \leq BRI_r, r \in R$$

$$\sum_{r \in R_e} \sum_{l \in L} TO_l xr_{lr} - \sum_{q \in R_e} \sum_{r \in R_e} \sum_{i \in L} \sum_{l \in L} T_{li} xr_{lr} xr_{iq} \leq BEO_e, e \in E$$

-continued $$\sum_{r \in R_e} \sum_{l \in L} TI_l xr_{lr} - \sum_{q \in R_e} \sum_{r \in R_e} \sum_{i \in L} \sum_{l \in L} T_{li} xr_{lr} xr_{iq} \leq BEI_e, e \in E$$

$xr_{lr} \geq 0, l \in L, r \in R \ni \sum_{s \in SR_r} F_{ls} \geq l$

The nonlinear optimization problem of step 312 may be solved using currently available mathematical programming solvers—for example MINOS.

At step 314, the resources that are to be allocated to the application are identified using a model for rounding the solution from step 312. This identification yields the allocated resource list 126. Step 314 provides a solution to the original problem from step 300 by formulating another mixed integer programming problem that essentially rounds the local optimal solution and identifies the exact servers that satisfy the application requirements 124. The decision variables are the same as those in the original model from step 300. The formulation for intelligent rounding is as follows.

$$\text{Min} \sum_{l \in L} \sum_{s \in S} x_{ls}$$

Subject to the following.

$$\sum_{s \in S} x_{ls} = N_l, l \in L$$

$$\sum_{l \in L} x_{ls} \leq 1, s \in S$$

$$\sum_{s \in SR_r} x_{ls} \geq \lfloor xr^*_{lr} \rfloor \text{ if } xr^*_{lr} > 0$$

$x_{ls} \in \{0, F_{ls}\}$

The term $xr^*$ is the local optimal solution from the formulation of step 312. The mixed integer programming problem of step 314 may be solved using currently available mathematical programming solvers—for example CPLEX.

The models presented above are applicable to an initial allocation of resources in particular. However, the models are easily extensible to handle dynamic incremental resource allocations to an existing application.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for resource allocation in a data center, comprising the steps of:
   providing, in a computer, a model for resource allocation which is adapted to a topology of the data center and an architecture of an application to be deployed in the data center;
   allocating, by the computer, a set of resources in the data center to the application using the model in response to a set of resource requirements of the application and a set of attributes of the resources in the data center, wherein the step of allocating a set of resources in the data center to the application using the model comprises the steps of:
determining an approximate solution to the model using a substitute model that does not include one or more constraints associated with the resource requirements and the attributes;
determining a solution to a relaxation of the model which is based on feasibility of resource allocation with respect to the constraints not included in the substitute model; and
identifying the resources allocated to the application using a model for rounding the solution to the relaxation of the model.

2. The method of claim 1, wherein the step of providing a model for resource allocation comprises the step of providing a mathematical model for resource allocation which is adapted to the topology of the data center and the architecture of the application.

3. The method of claim 1, wherein the step of allocating comprises the step of allocating the resources using the model such that communication delay among the resources allocated to the application is minimized.

4. The method of claim 1, wherein the step of determining a solution to a relaxation of the model comprises the step of determining a solution to a relaxation of the model which is based on feasibility of resource allocation with respect to the constraints not included in the substitute model and which uses the approximate solution as an initial solution.

5. The method of claim 1, wherein the step of determining an approximate solution to the model using a substitute model that does not include one or more constraints comprises the step of determining an approximate solution to the model using a substitute model that does not include one or more of a set of bandwidth constraints.

6. The method of claim 1, wherein the step of providing a model for resource allocation which is adapted to a topology of the data center comprises the step of providing a model for resource allocation which is adapted to a hierarchical tree topology.

7. The method of claim 1, wherein the step of providing a model for resource allocation which is adapted to an architecture of an application comprises the step of providing a model for resource allocation which is adapted to a multi-layer architecture of the application.

8. The method of claim 1, wherein the data center has servers and elements interconnecting the servers, and wherein providing the model for resource allocation is adapted to a physical topology of the servers and elements interconnecting the servers in the data center and the architecture of the application to be deployed in the data center.

9. The method of claim 8, wherein allocating the resources in response to the set of resource requirements of the application comprises allocating the resources in response to the set of resource requirements relating to at least some of a number of CPUs, a CPU speed, a memory capacity, and an amount of traffic relating to at least one server in the data center.

10. The method of claim 8, wherein the physical topology is described by a topology description, and wherein providing the model is based on the topology description.

11. A resource deployment system, comprising:
a computer;
a model for resource allocation which is adapted to a physical topology of a data center and an architecture of an application to be deployed in the data center; and
a resource allocator executable in the computer to identify a set of resources in the data center that are to be allocated to the application using the model in response to a set of resource requirements of the application and a set of attributes of resources in the data center,
wherein the resource allocator is executable in the computer to use the model by determining an approximate solution to the model using a substitute model that does not include one or more constraints associated with the resource requirements and the attributes, determining a solution to a relaxation of the model which is based on feasibility of resource allocation with respect to the constraints not included in the substitute model, and then rounding the solution to the relaxation of the model.

12. The resource deployment system of claim 11, wherein the model is adapted to minimize communication delay among the resources allocated to the application.

13. The resource deployment system of claim 11, wherein the resource allocator uses the approximate solution as an initial solution to the relaxation of the model.

14. The resource deployment system of claim 11, wherein the substitute model does not include one or more of a set of bandwidth constraints.

15. The resource deployment system of claim 11, wherein the physical topology of the data center is a hierarchical tree topology.

16. The resource deployment system of claim 11, wherein the model for resource allocation is adapted to the physical topology of the data center that has servers and elements interconnecting the servers, and the architecture of the application that has multiple layers.

17. The resource deployment system of claim 16, wherein the set of attributes comprise attributes for the servers and the elements interconnecting the servers.

18. The method of claim 16, wherein the physical topology is described by a topology description, and wherein the model is based on the topology description.

19. A non-transitory computer-readable storage medium that contains a program that when executed by a computer allocates resources in a data center by performing the step of:
allocating a set of resources in the data center to an application to be deployed in the data center using a model for resource allocation in response to a set of resource requirements of the application and a set of attributes of the resources in the data center, wherein the model is adapted to a topology of the data center and an architecture of an application to be deployed in the data center,
wherein the step of allocating a set of resources in the data center to the application using the model comprises the steps of:
determining an approximate solution to the model using a substitute model that does not include one or more constraints associated with the resource requirements and the attributes;
determining a solution to a relaxation of the model which is based on feasibility of resource allocation with respect to the constraints not included in the substitute model;
identifying the resources allocated to the application using a model for rounding the solution to the relaxation of the model.

20. The computer-readable storage medium of claim 19, wherein the step of allocating comprises the step of allocating the resources using the model such that communication delay among the resources allocated to the application is minimized.

21. The computer-readable storage medium of claim 19, wherein the step of determining a solution to a relaxation of the model comprises the step of determining a solution to a relaxation of the model which is based on feasibility of resource allocation with respect to the constraints not included in the substitute model and which uses the approximate solution as an initial solution.

22. The computer-readable storage medium of claim 19, wherein the step of determining an approximate solution to the model using a substitute model that does not include one or more constraints comprises the step of determining an approximate solution to the model using a substitute model that does not include one or more of a set of bandwidth constraints.

23. The computer-readable storage medium of claim 19, wherein the model for resource allocation is adapted to a hierarchical tree topology of the data center.

24. The computer-readable storage medium of claim 19, wherein the data center has servers and elements interconnecting the servers, and the topology is represented by a topology description of the servers and the elements interconnecting the servers, and wherein the model is adapted to the topology represented by the topology description.

25. The computer-readable storage medium of claim 24, wherein the application to be deployed on the data center having the servers and the elements interconnecting the servers is a multi-layered application, and wherein the model is adapted to the multi-layered application.

* * * * *